(12) United States Patent
Keane et al.

(10) Patent No.: US 7,092,845 B2
(45) Date of Patent: Aug. 15, 2006

(54) COMPUTATIONAL DESIGN METHODS

(75) Inventors: Andrew J Keane, Highfield (GB); Neil W Bressloff, Highfield (GB); Alexander I J Forrester, Highfield (GB)

(73) Assignees: BAE Systems plc, London (GB); Rolls-Royce plc, London (GB)

( * ) Notice: Subject to any disclaimer, the term of this patent is extended or adjusted under 35 U.S.C. 154(b) by 13 days.

(21) Appl. No.: 10/503,471

(22) PCT Filed: Jun. 24, 2004

(86) PCT No.: PCT/GB2004/002713

§ 371 (c)(1),
(2), (4) Date: Aug. 4, 2004

(87) PCT Pub. No.: WO2005/001722

PCT Pub. Date: Jan. 6, 2005

(65) Prior Publication Data
US 2005/0143962 A1  Jun. 30, 2005

(30) Foreign Application Priority Data
Jun. 25, 2003 (EP) ................. 03253997
Jun. 25, 2003 (GB) ................. 0314842.6

(51) Int. Cl.
*G06F 13/12* (2006.01)

(52) U.S. Cl. ............. 702/182; 702/179; 702/183; 702/189

(58) Field of Classification Search ......... 702/66, 702/73, 149–153, 179, 180, 182, 183; 382/154; 700/83; 703/12; 709/224
See application file for complete search history.

(56) References Cited

U.S. PATENT DOCUMENTS

| | | | | |
|---|---|---|---|---|
| 5,267,276 A | * | 11/1993 | Vujic | 376/215 |
| 5,649,064 A | * | 7/1997 | Jorgensen et al. | 706/17 |
| 6,064,759 A | * | 5/2000 | Buckley et al. | 382/154 |
| 6,381,564 B1 | | 4/2002 | Davis et al. | |
| 2003/0009317 A1 | * | 1/2003 | Dhir et al. | 703/7 |

OTHER PUBLICATIONS

Jansen et al; "Proceedings of 2000 International Symposium on Microelectronics"; 2000, IMAPS, pp. 398-405, Virtual Thermo-Mechanical Prototyping of Electronic Packaging Using Philips' Optimization Strategy.

(Continued)

*Primary Examiner*—Marc S. Hoff
*Assistant Examiner*—Felix Suarez
(74) *Attorney, Agent, or Firm*—Nixon & Vanderhye P.C.

(57) ABSTRACT

A method of identifying a configuration of an object, the method comprising the steps of: specifying a plurality of different object configurations; for each specified object configuration, using a first simulation procedure to simulate the specified conditions so as to generate data that can be used to evaluate the object configuration against the optimisation criterion; identifying a functional relationship between data generated for each specified object configuration; using the functional relationship and the optimisation criterion to select a data point, and identifying an object configuration corresponding thereto; and using a second simulation procedure, wherein the second simulation procedure comprises iteratively calculating values of variables characterising the object configuration until the values satisfy a convergence criterion, wherein for at least one of the specified object configurations, the first simulation procedure is completed before the values calculated therein satisfy the convergence criterion used in the second simulation procedure.

17 Claims, 10 Drawing Sheets

OTHER PUBLICATIONS

Dadone et al; "Progressive Optimization of Inverse Fluid Dynamic Design Problems"; Computers & Fluids, Jan. 2000, Elsevier, UK, vol. 29, No. 1, pp. 1-32, XP002261027.

Reddy et al; "Aerodynamic Shape Optimization of a Subsonic Inlet Using Three-Dimensional Euler Computation"; Journal of Propulsion and Power, American Institute of Aeronautics and Astronautics, New York, US, vol. 14, No. 2, Mar. 1, 1998, XP000741321.

Jamesson et al; "Optimum Aerodynamic Design Using the Navier-Stokes Equations"; AIAA Aerospace Sciences Meeting/AIAA Thermophysics Conference, XX, XX, 1997, pp. 1-22, XP002092992.

Morris et al; "Exploratory Designs for Computational Experiments"; Journal of Statitical Planning and Interference, Elsevier, Amsterdam, NL, vol. 43, 1995, pp. 381-402, XP000925793.

D. Bowman et al, "Optimization of Low-Perigee Spacecraft Aerodynamics" *Journal of Spacecraft and Rockets*, vol. 40, No. 1, Jan.-Feb. 2003, pp. 56-63.

\* cited by examiner

COMPUTATIONAL DESIGN METHODS

This application is the U.S. national phase of international application PCT/GB04/02713, filed 24 Jun. 2004, which designated the U.S. and claims priority to GB Application No. 0314842.6, filed 25 Jun. 2003 and EP 03253997.5, filed 25 Jun. 2003. The entire contents of these applications are incorporated herein by reference.

FIELD OF THE INVENTION

The present invention is related to design methods and is particularly, but not exclusively, related to optimisation design methods that use computationally expensive analysis methods.

BACKGROUND OF THE INVENTION

Many engineering problems are concerned with identifying a design that minimises or maximises certain parameters whilst satisfying certain constraints; in essence the aim of a design method is to find an optimum and feasible design.

Typically, potential designs are identified (commonly referred to as "solutions") and their parameters evaluated against a cost function. Since, by definition, an optimal design is unknown prior to the optimisation process, known methods apply an equal amount of computing effort to all potential designs. Clearly most of these potential designs will be sub-optimal, which means that evaluating all potential solutions is a significant waste of processing resources.

Such computationally expensive design problems include identifying a shape and structure of aerodynamic bodies (aircraft wings, fuselage, motorbike fairings, racing car fairings) that need to withstand certain conditions. Typically well-known techniques such as Computational Fluid Dynamics (CFD) and Finite Element Analysis (FEA) are applied to identify an optimal design of such bodies, where, respectively, the flow over and force upon the body is modelled and the drag and yield point of the body identified. Although these techniques work well, they are extremely computationally expensive. In the area of CFD, convergence of solutions can take several hours, even for inviscid models (e.g. an Euler model where fluid flowing over the body is assumed to have zero viscosity) run in respect of a single body configuration takes 3 hours on 4 parallel Pentium 4 processors). This means that it is impractical to run a full CFD analysis for many different body configurations.

In order to reduce the computational time associated with identifying an optimal object configuration, so-called Response Surface Models (RSM) have been developed. For the example of CFD, Response Surface Models are integrated with the more computationally expensive analysis methods by running a full CFD analysis in respect of several object configurations (typically between 10 and 100), and pooling the output of the respective CFD calculations in order to provide a landscape (a Response Surface) for searching for an optimum design. This method significantly decreases the amount of time required to identify optimum designs, but large amounts of computational time are nevertheless spent investigating object configurations that are sub-optimal.

PRIOR ART

U.S. Pat. No. 6,381,564 (Texas Instruments) describes a method of optimising tuning of complex simulators. The method includes building a response-surface model in a simulator and providing an optimisation function.

U.S. Patent US-B-2000/0009317 (Ford Motor Company) describes a system that enables a designer to determine an optimal design. Response surface models (RSM) are used as surrogates for more complex models of a mechanical system. Values obtained for the RMS's are optimised over ranges of possible values in order to arrive at a final design.

An object of the present invention is to reduce computational processing requirements.

SUMMARY OF THE INVENTION

According to a first aspect of the present invention there is provided a method of identifying a configuration of an object that satisfies a predetermined optimisation criterion under specified conditions, the method comprising the steps of:

(i) specifying a plurality of different object configurations;

(ii) for each specified object configuration, using a first simulation procedure to simulate the specified conditions so as to generate data that can be used to evaluate the object configuration against the optimisation criterion, wherein the first simulation procedure comprises iteratively calculating values of variables characterising the object configuration;

(iii) identifying a functional relationship between the data generated for each specified object configuration;

(iv) using the functional relationship and the optimisation criterion to select a data point, and identifying an object configuration corresponding thereto; and (v) using a second simulation procedure, simulating the specified conditions in respect of the identified object configuration, wherein the second simulation procedure comprises iteratively calculating values of variables characterising the object configuration until the values satisfy a convergence criterion, characterised in that, for at least one of the specified object configurations, the first simulation procedure is completed before the values calculated therein satisfy the convergence criterion used in the second simulation procedure.

Since the simulating step is completed earlier than is the case with known methods, the amount of computational time involved with embodiments of the invention is reduced.

In one arrangement, for at least one of the specified object configurations, the values calculated on completion of the first simulation procedure are less than 99% correlated with the values which would be calculated on completion of the second simulation procedure using the same object configuration.

Preferably the method comprises completing a first simulation procedure when the values calculated therein satisfy a convergence criterion which is different to the convergence criterion used in the second simulation procedure.

Advantageously the convergence criterion used in the first simulation procedure is applied by calculating a correlation coefficient indicative of correlation in respect of successive iterations of values of variables and determining whether the calculated correlation coefficient is substantially equal to a specified correlation coefficient.

Alternatively, or additionally, the method includes calculating an average of two or more successive correlation coefficients and determining whether the calculated average is substantially equal to a specified value.

A first embodiment is concerned with aerodynamic optimisation of a body such as an aircraft wing. In this embodiment the simulating step is performed by a Computational Fluid Dynamics (CFD) model. The CFD model is run in a specified domain, in which a body is located, in order to resolve the flow field around the body. A set of input conditions, for example in the form of velocities and densities of fluid; and shape, material and dimensions of the body, is specified. The CFD model simulates flow of fluid over the body and evaluates various flow-related parameters at specified locations along the body. In particular, the ratio of lift/drag associated with the configuration (i.e. shape) of the body is evaluated. These values of lift/drag are then used to build a response surface, as will be described in more detail below.

Embodiments of the invention may be applied to optimisation scenarios other than aerodynamic optimisation, and thus to problems other than flow around bodies. For example, embodiments of the invention could be applied in conjunction with Finite Element Analysis methods, where the aim is to identify a structure of a body that can withstand a certain force; and computational electromagnetic methods (CEM).

Further features and advantages of the invention will become apparent from the following description of preferred embodiments of the invention, given by way of example only, which is made with reference to the accompanying drawings.

BRIEF DESCRIPTION OF THE DRAWINGS

FIG. 7 is a graph showing contours of Lift/Drag corresponding to flow over the body shown in FIG. 1 when operation of the CFD model has been stopped part-way in accordance with convergence criteria identified from FIG. 6a;

FIG. 8b is a graph showing further contours of Lift/Drag corresponding to FIG. 8a;

DETAILED DESCRIPTION OF PREFERRED EMBODIMENTS OF THE INVENTION

Figure 1:
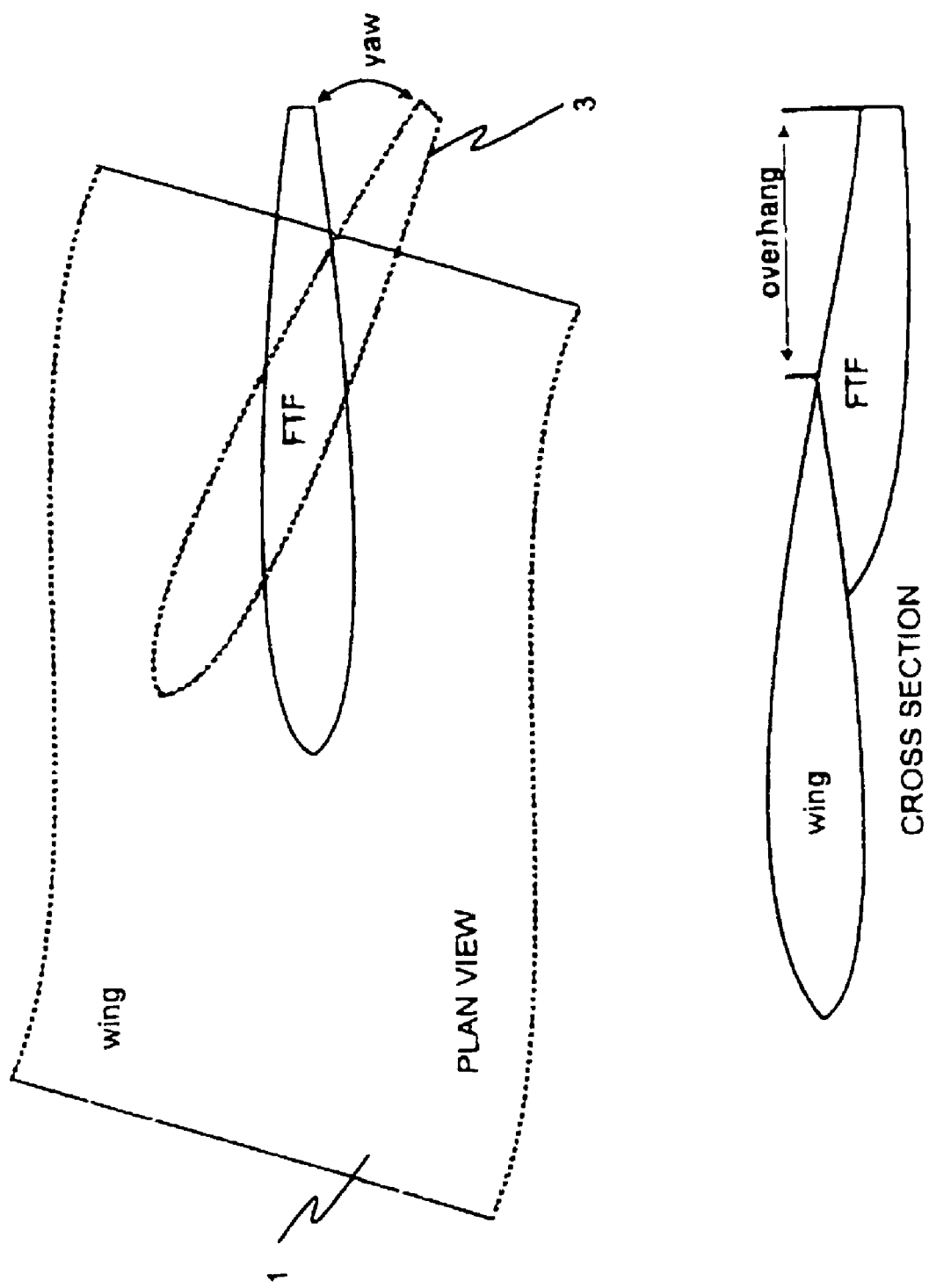
FIG. 1 is a schematic diagram of a body whose configuration is to be optimised in accordance with a method embodying the invention.
Figure 2:
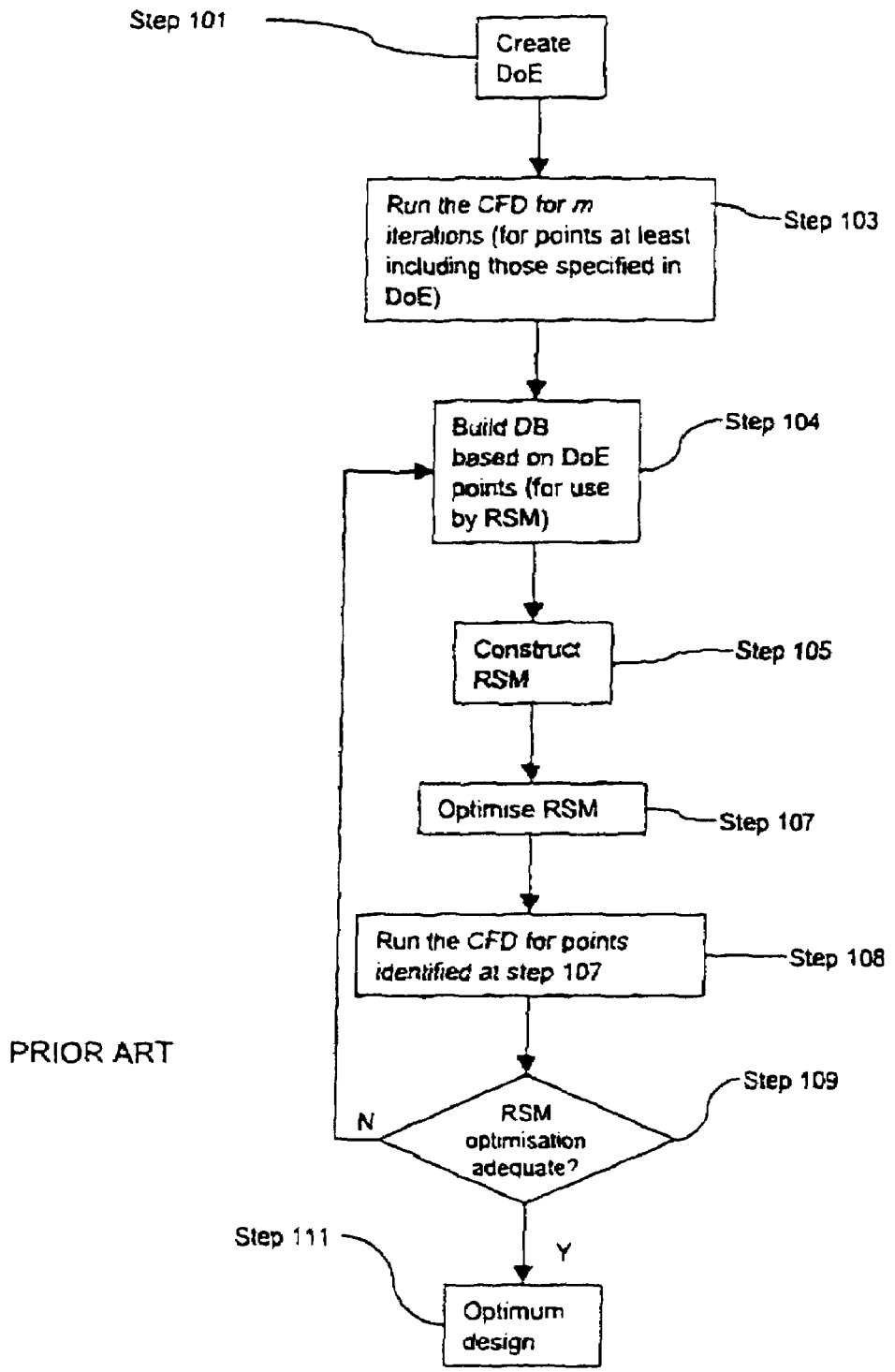
FIG. 2 is a flow diagram showing steps involved in a conventional surrogate design method.

Referring to FIGS. 1 and 2, an overview of the conventional design process within which embodiments operate will firstly be described.

FIG. 1 shows a plan view and cross section of an aircraft wing 1 comprising a flap track fairing (FTF) 3 whose shape is to be optimised. Embodiments of the invention are concerned with identifying an optimum shape of wing 1 and FTF 3, in terms of yaw angle and overhang of the FTF 3, for which the Lift/Drag is a maximum. However it should be realised that other parameters could be used in the alternative or in addition. Many methods are available for estimating these parameters, and those with which embodiments of the invention are concerned, referred to herein as surrogate design methods, are shown in FIG. 2.

Turning now to FIG. 2, at step 101 a plurality of design configurations is specified, each corresponding to a different configuration of the body whose shape is to be optimised (here a FTF). Each configuration can be represented by a point that encapsulates information relating to the particular geometry of the body (in the art the plurality of configurations (design points) is referred to as a Design of Experiments (DoE)). Preferably the design points are selected so that a range of different configurations are represented (methods for selecting such points are described in "Response surface methodology: process and product optimisation using designed experiments", published by Wiley & Sons (New York), and authored by Myers and Montgomery). The design points can be selected in accordance with an optimal Latin hypercube method, described by Mackay et al in "a comparison of three methods for selecting values of input variables in the analysis of output from a computer code", published in Technometrics, Vol. 21 pp 239–245, 1979; an algorithm implementing this method is described by Morris and Mitchell in "Exploratory designs for computer experiments", published in the Journal of statistical planning and interference, Vol. 43, pp 381–402 in 1995. An alternative method is known as the "LPτ" sequences method, described by Sobol in a paper entitled "On the systematic search in a hypercube", published in SIAM Journal of Numerical analysis Vol. 16, pp 790–793, 1979. This differs from the optimal Latin hypercube method in that an "LPτ" sequence allows design points to be added or removed whilst maintaining an acceptable range of different design points (known as space-filling distribution of points). It is not as space filling as an optimal Latin hypercube, but is well suited to investigating varying numbers of design points.

As a general rule of thumb, the number of configurations (design points) should be an order of magnitude of around 10 times the number of parameters of interest, which may be two or more. As stated above, in the present embodiments, the parameters of interest are yaw angle (θ) and overhang of the flap track fairing (so there are two such parameters); accordingly each of 10, 20, 30 and 60 configurations (design points) is considered and data relating thereto compared.

Next (step 103), a simulation method, which, in the present embodiment is a Computational Fluid Dynamics (CFD) model such as FLUENT™, or STAR CD™, is applied to each of the configurations (design points). As described above, the CFD model generates, as output, data representative of flow field around the body, from which values of the lift and drag associated with the wing and FTF can be evaluated. Drag is essentially a measure of the cost while lift is a measure of the benefit associated with the shape of the body, and the goal of the overall design process is to identify a body shape that maximises the lift/drag ratio. This step thus involves running of a CFD model for each of the configurations specified at step 101 (design points), which, for each configuration, results in flow field parameters being modified iteratively. The CFD model is iteratively run until the flow field around the body has "converged"; that is to say when the variation (known in the art as residual) in mass flow rate between successive iterations reaches a specified value. In some cases this specified value can be $10^{-5}$ or less. In the particular case of the CFD model being used to simulate flow around FTF, aircraft wings, fuselages and the like, convergence can be assessed on the basis of a residual associated with the forces on the body (rather than on mass flow rate). For example, the residual could be based on force coefficients of drag and lift, a moment coefficient or a pressure coefficient; the skilled person will realise that other force-related parameters can be used.

For each configuration, values of lift and drag are output at successive iterations. Since the CFD model is applied to a plurality of different configurations, the output from this step is a corresponding plurality of lift and drag data.

Next, (steps 104 and 105), an approximation to the lift and drag at all possible configurations of overhang and yaw angle is derived. In the following description, output from the CFD model is referred to as observations, and the aim of step 105 is essentially to fit a curve through all of the data output at step 103. One way of doing this is to identify an approximation function that best fits the observed data. Mathematically this can be expressed as follows:

$\underline{y} = f(\underline{x})$ where $\underline{y}$ is a vector of observations (stored in a database at step 104) and $\underline{x} = (x_1, x_2, x_3 \ldots)$ (where $\underline{x}$ is a vector of independent variables)

An approximation to the observed response y is expressed as follows:

$\hat{\underline{y}} = \hat{f}(\underline{x})$ where $\hat{f}(\underline{x})$ is an approximation function F (the "curve" that will be fit to the data output at step 103)

One of many known methods can be applied to identify the approximation function F; these methods are generally referred to as Response Surface Models (RSM) and essentially involve training a model to reproduce the observations data $\underline{y}$, the model thereafter being used to predict values of parameters at other points or being used to search for "better" points. In the present embodiment, a RSM known as the Kriging method is used (described by Jones et al in "Efficient global optimization of expensive black box functions", in Journal of Global Optimisation Vol. 13, pp 455–492, 1998). Other suitable methods include a polynomial response surface method (Myers and Montgomery, supra); radial basis functions (described in "Radial basis functions for multivariable interpolation: A Review" in Algorithms for Approximation, pp 143–167, by Powell 1987); and neural networks (described in "Artificial neural networks: approximation and learning theory", White et al 1992, published by Blackwell).

As stated above, in the present embodiments, each configuration has an associated overhang and yaw angle; thus each configuration can be represented as a point in two-dimensional space (since each wing and FTF configuration will have particular values for overhang and yaw angle). The output from step 103 can then be plotted in 2-dimensional space and in step 105 a curve is determined that "best fits", according to a best fit algorithm, to all of these points. The response surface model is repeatedly modified until a balance is reached between regression and interpolation, which is quantified as a regression error. Development of the response surface model in this manner is referred to as training the response surface model, and the regression error is method-dependent.

Having suitably trained the response surface model, the model is used to identify points (if any) at which the lift/drag ratio is likely to be maximised (step 107). This step involves searching along the curve generated at step 105 to identify possible points along that curve at which the lift/drag ratio might be maximised. As will be appreciated from the foregoing, each point along the curve (response surface) represents a different wing and FTF configuration. Various methods can be applied to identify such points, including the expected improvement (EI) function (the EI is a trade off between the predicted error in the RSM and the value of the RSM. Thus, the EI is low near design points where the RSM has a low value and high far from design points where the RSM has a high value) using either gradient descent or a genetic algorithm with clustering and sharing (described in Jones, supra); or local optima method, in which the points corresponding to maximum lift/drag is/are identified and regions around that/the optimum point(s) are investigated. In the event that one or more points is/are found at which the values of lift/drag are likely to be higher, these/this point(s) is/are selected and added to the design points that were originally specified in step 101. This modification of points is referred to as optimisation of the response surface RS, since the surface is being improved in areas where a new wing configuration has been identified for which values of overhang and yaw angle are likely to be optimised.

Having optimised the response surface RS, by selecting one or more new points, the one or more configurations corresponding to these points are evaluated by the CFD model (step 108) and the output therefrom is compared with a predetermined optimisation criterion (step 109). If the output from the CFD model associated with these points does not satisfy the criterion, steps 104, 105 are then repeated to identify a new Response Surface Model, and the response surface is again optimised (step 107).

These steps are repeated until such time as the values of overhang and yaw satisfy the optimisation criterion (step 111), whereupon whichever wing configuration corresponds to the point satisfying the criterion is identified.

Figure 3:
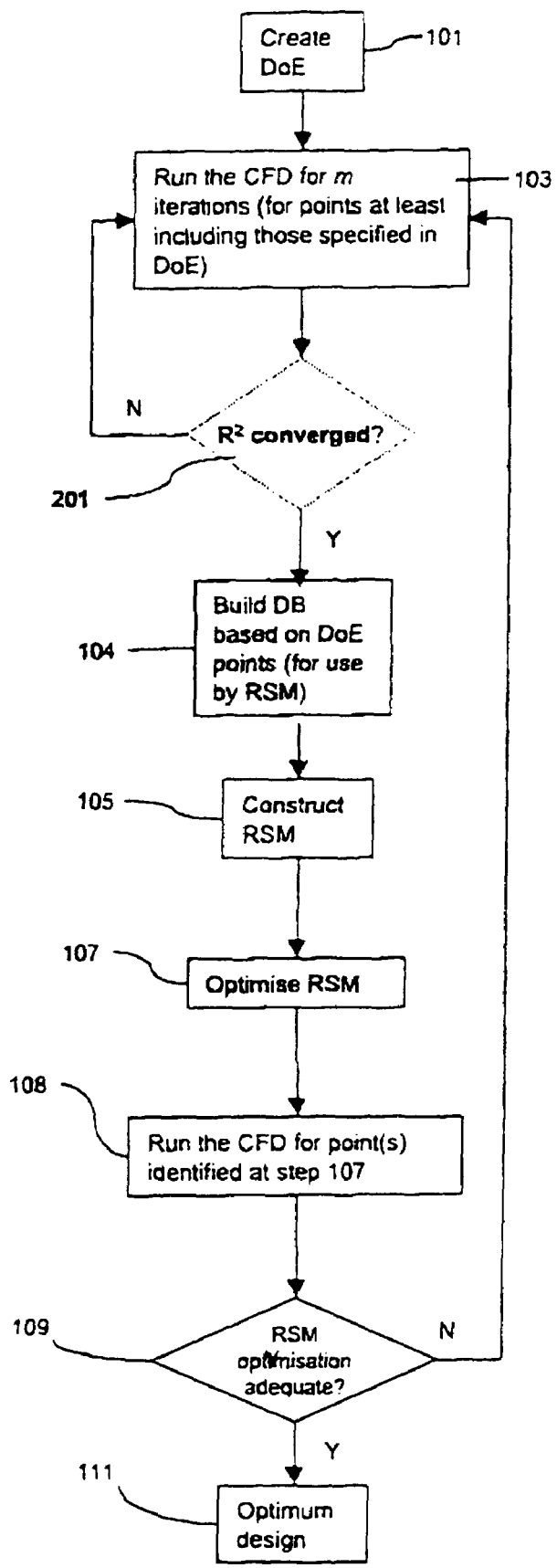
FIG. 3 is a flow diagram showing modification of the conventional surrogate design method shown in FIG. 2 according to a first embodiment of the invention.
Figure 4:
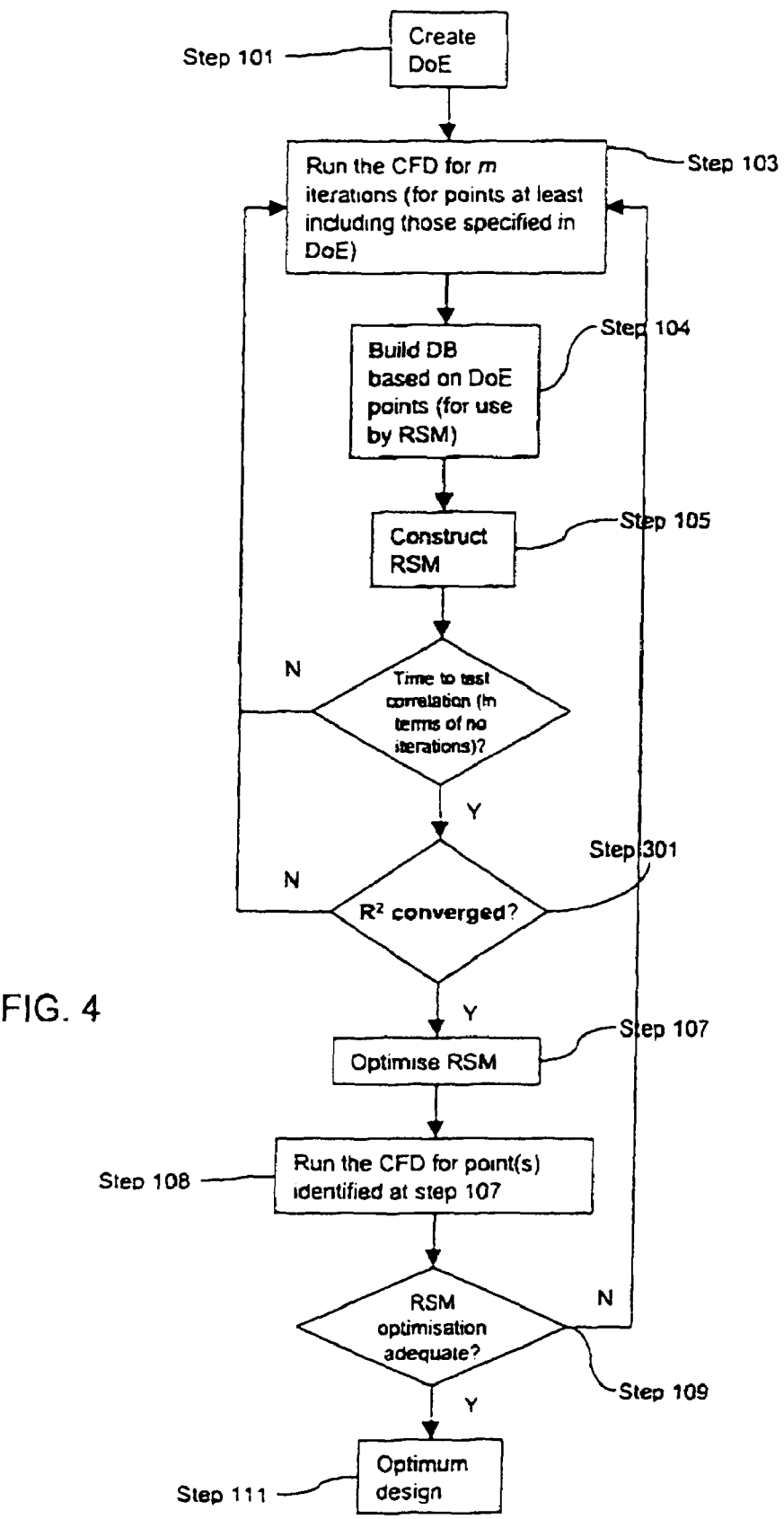
FIG. 4 is a flow diagram showing modification of the conventional surrogate design method shown in FIG. 2 according to a second embodiment of the invention.
Figure 5:
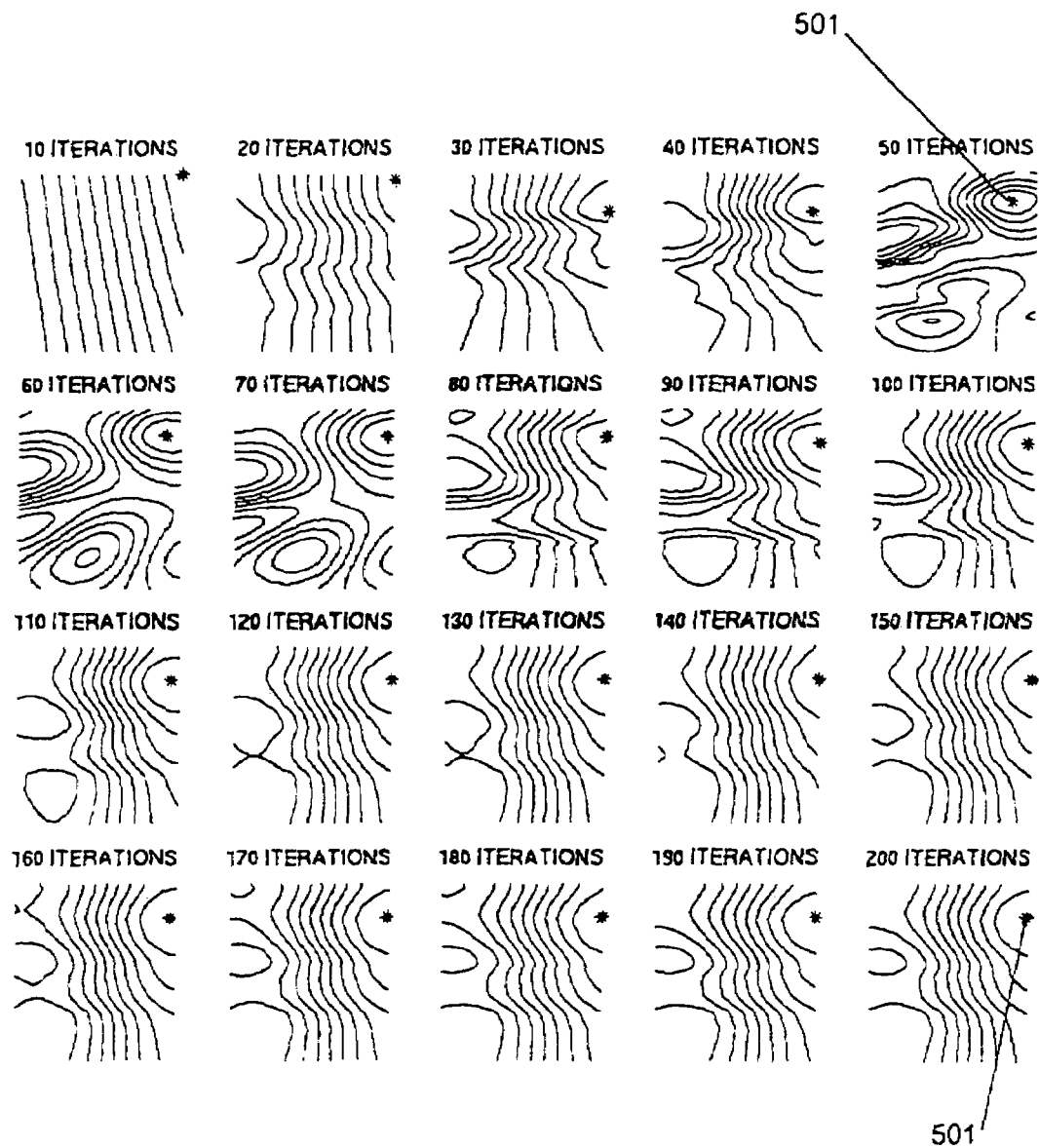
FIG. 5 is a schematic diagram showing contours of Lift/Drag corresponding to flow over the body shown in FIG. 1 at successive iterations.

Turning to FIGS. 3 to 5, embodiments of the invention will now be described. FIGS. 3 and 4 show two different embodiments of the invention is and FIG. 5 shows contours of lift/drag for yaw angle versus overhang obtained using the Kriging method at various stages of the evolution of the response surface.

Embodiments of the invention have arisen from the realisation that information about the response surface can be obtained either before the response surface has fully been formed and/or before the simulation model has fully converged. As a result of this realisation, values of flow field parameters ($\underline{y}$) obtained part-way through the CFD calculations and/or values of the RSM ($\hat{\underline{y}}$) obtained part-way through the development of the RSM can be used, instead of those obtained at the end of full convergence. The decision as to where, in the development of the RSM, the part-way point is, can be made in dependence on one of several criteria, including: correlation between data or surfaces generated at successive iterations; moving average of correlation; and stabilisation of gradients between the response surfaces at successive iterations.

In a first embodiment one or more of the criteria are applied in respect of the CFD calculations; turning to FIG. 3, for each configuration (design point) correlation between data generated at n iterations and n–m iterations is compared at step 201, and, if the correlation satisfies the correlation criterion, the values corresponding to n iterations are used to train the RSM in accordance with steps 104 and 105 described above. Optimisation of the DoE specified at step 101 then follows steps 107–111. In this embodiment, convergence of the CFD data is evaluated on the basis of a correlation coefficient $r^2$, defined as follows:

$$r_m^2 = \left( \frac{N \sum f_n f_{n-m} - \sum f_n \sum f_{n-m}}{\sqrt{([N \sum f_n^2 - (\sum f_n)^2][N \sum f_{n-m}^2 - (\sum f_{n-m})^2])}} \right)^2 \quad \text{Eqn 1}$$

where N is the number of points to be correlated (size of the DoE); $f_n$ is the value of L/D output from the CFD calculations after n iterations and $f_{n-m}$ is the value of L/D m iterations earlier. Thus in this embodiment convergence is assessed on the basis of force-related parameters (and not mass-related parameters).

Figure 6A:
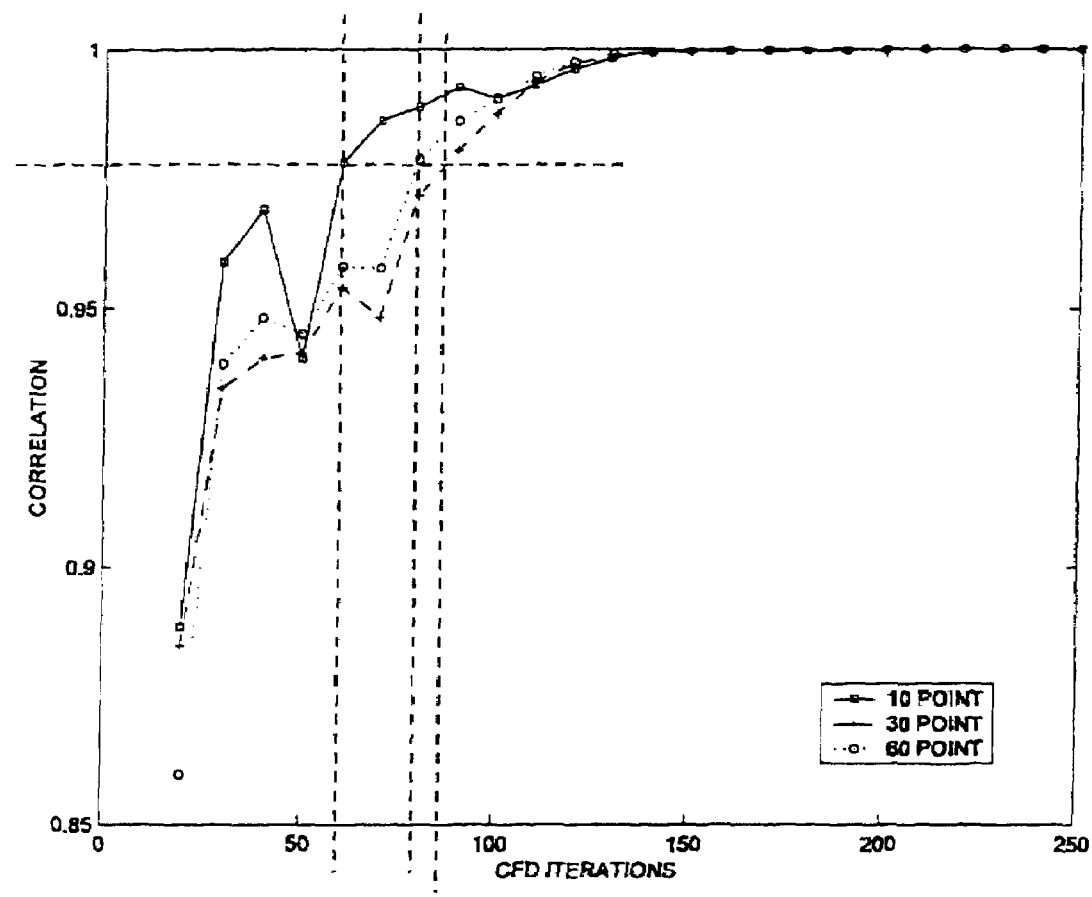
FIG. 6a is a graph showing convergence of yaw angle and overhang data generated by CFD model.

The test applied at step 201 involves reviewing the value of $r^2$ against a specified correlation coefficient $r_{spec}$, and progressing onto step 104 (building the RSM model) in the event that $r^2 > r_{spec}$. FIG. 6a shows development of correlation coefficients over a number of iterations (for a number of different wing configurations), and it can be seen that, when there are 10 configurations, the correlation coefficient reaches approximately 0.98 after around 60 iterations (and doesn't fall below this value thereafter); when there are 30 configurations, the correlation coefficient reaches approximately 0.97 after around 85 iterations; and when there are 60 configurations, the correlation coefficient reaches approximately 0.97 after around 80 iterations.

Turning to FIG. 4, in a second embodiment, approximations f(x) generated in respect of successive iterations of the CFD model (step 103) are compared at step 301, again by means of a correlation coefficient, according to the following expression:

$$r_m^2 = \left( \frac{N \sum \hat{f}_n \hat{f}_{n-m} - \sum \hat{f}_n \sum \hat{f}_{n-m}}{\sqrt{\left( [N \sum \hat{f}_n^2 - (\sum \hat{f}_n)^2][N \sum \hat{f}_{n-m}^2 - (\sum \hat{f}_{n-m})^2] \right)}} \right)^2 \quad \text{Eqn 2}$$

where N is the number points taken from the RSM, $\hat{f}_n$ is an approximation of L/D after n iterations of the CFD calculations and $\hat{f}_{n-m}$ is an approximation of L/D taken m iterations earlier. In this embodiment a plurality of response surface models is built, each after a specified number of iterations (m) of the CFD model has been performed. This is quite different to the conventional method, described above, where the response surface model is only built after the CFD model has fully converged, and the CFD model is only applied thereafter to points identified as possible optimum points at step 107.

Figure 6B:
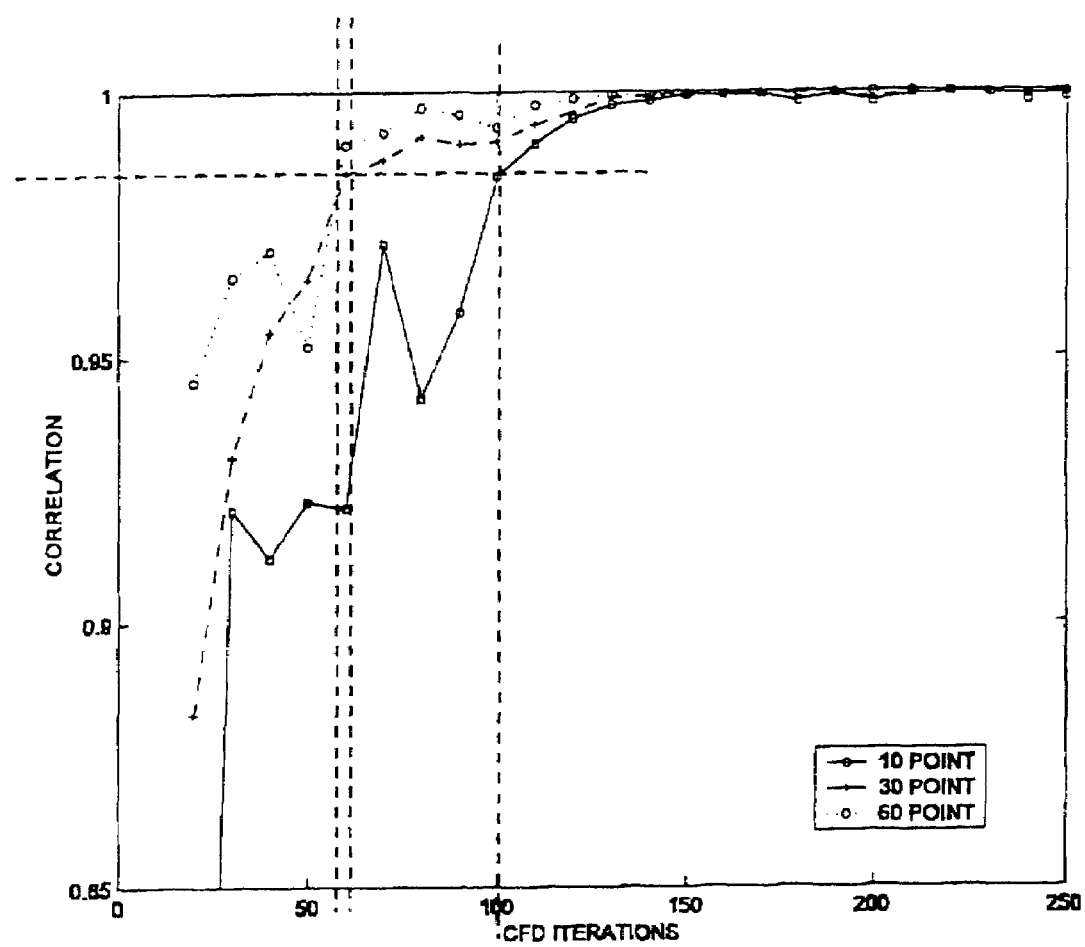
FIG. 6b is a graph showing convergence of yaw angle and overhang data corresponding to a response surface being trained to replicate the CFD data.

FIG. 5 shows response surface evolution based on a DoE comprising 20 points (i.e. 20 wing and FTF configurations) after 10, 20, 30 . . . 200 iterations of the CFD model. The ordinance axis represents overhang and the abscissa axis represents yaw angle, and the CFD output is presented as contours, each representing a range of lift/drag ratios. The location at which overhang and yaw angle are optimised (lift/drag optimised) is represented by location 501 on the Figure, and it can be seen that this location does not change substantially between 50 and 200 iterations, despite the fact that the shape of the contours changes substantially between the intervening iterations. FIG. 6b shows correlation coefficient as a function of number of iterations, and it can be seen that, when there are 10 configurations, the correlation coefficient reaches approximately 0.97 after around 100 iterations (and doesn't fall below this value thereafter); when there are 30 configurations, the correlation coefficient reaches approximately 0.97 after around 70 iterations; and when there are 60 configurations, the correlation coefficient reaches approximately 0.97 after around 65 iterations.

When the number of configurations (design points) is large, the second embodiment is a preferred embodiment since optimisation of the FTF configuration (via values of overhang and yaw angle) is performed by optimising the response surface RS. However, when there are only a few configurations (points) the first embodiment is preferred, since correlation of the CFD data is a better indicator of the stabilisation of convergence at an early stage in the iterations.

Since, for either embodiment, the correlation test (steps 201, 301) is applied prior to the optimisation process (step 107), the value of $r_{spec}$ is at least partly dependent on the nature of the subsequent optimisation and the accuracy required. If the optimisation method is such that points are added to the DoE, $r_{spec}$ can be relatively low, e.g. 0.95, since the response surface RS will become more accurate as more points (configurations) are added. If the optimisation method is such that only a selected area of the response surface is investigated during optimisation, $r_{spec}$ should be relatively high, e.g. 0.99 before the area is selected and investigation begins.

In either embodiment, the correlation coefficient is checked after a specified number of iterations m (in the above example, 10). The spacing between checking is dependent on a trade off between CFD runtime and restart time: if step 103 involves running a finely meshed grid running a Navier-Stokes simulation (i.e. viscous flow round the wing), the restart time is negligible compared to runtime, so that the spacing m between iterations can be relatively fine. In practice, however, flow patterns simulated using a Navier-Stokes simulation may only develop after a significant number of iterations, which means that the spacing m can be of the order 100, and sometimes 250 iterations. It will be appreciated that the value of m is problem-dependent, since the flow patterns are dependent on the shape and configuration of the object. If step 103 involves running a coarsely meshed grid running an Euler simulation (i.e. inviscid flow round the wing), the restart time and runtime may be comparable, so that the spacing m should be coarser.

Tables 1 and 2 present a summary of three test arrangements and outputs relating thereto:

TABLE 1

| | | Input | | Output | |
|---|---|---|---|---|---|
| Test | Initial conditions | Correlation criteria | Optimisation method (step 107) | Correlation criteria satisfied (# iterations) | Modifications to RSM and subsequent calculations details |
| 1 | No. wing configurations (design points): | Correlation applied to CFD data | Expected Improvement (gradient | 40 | 5 update points added to response surface so 15 points |

TABLE 1-continued

| Test | Initial conditions | Input Correlation criteria | Optimisation method (step 107) | Output Correlation criteria satisfied (# iterations) | Modifications to RSM and subsequent calculations details |
|---|---|---|---|---|---|
| | 10; RSM constructed using Kriging method | (Eqn 1) $r^2_{10} > 0.95$ | descent with multiple restarts) | | subsequently used for next evaluation; subsequent evaluations involve full convergence for all 15 points |
| 2 | No. wing configurations (design points): 60; RSM constructed using Kriging method | Correlation applied to RSM (Eqn 2) $r^2_{10} > 0.95$ | Local optima - (gradient descent with multiple restarts) design space reduced by 50% around the optimum | 30 | Design space reduced by 50% around optimum; 20 points selected for next evaluation; subsequent evaluations involve full convergence for all 20 points |

Figure 7:
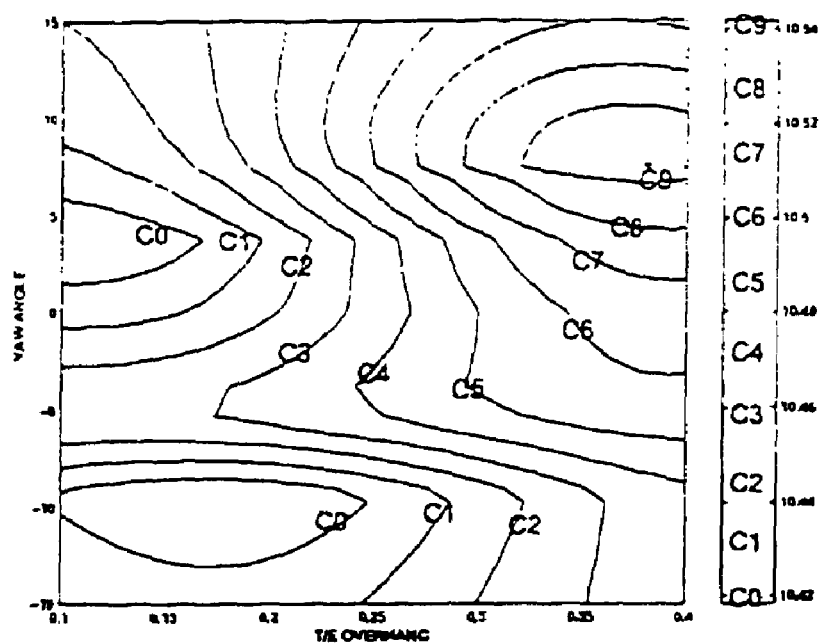
Figure 8A:
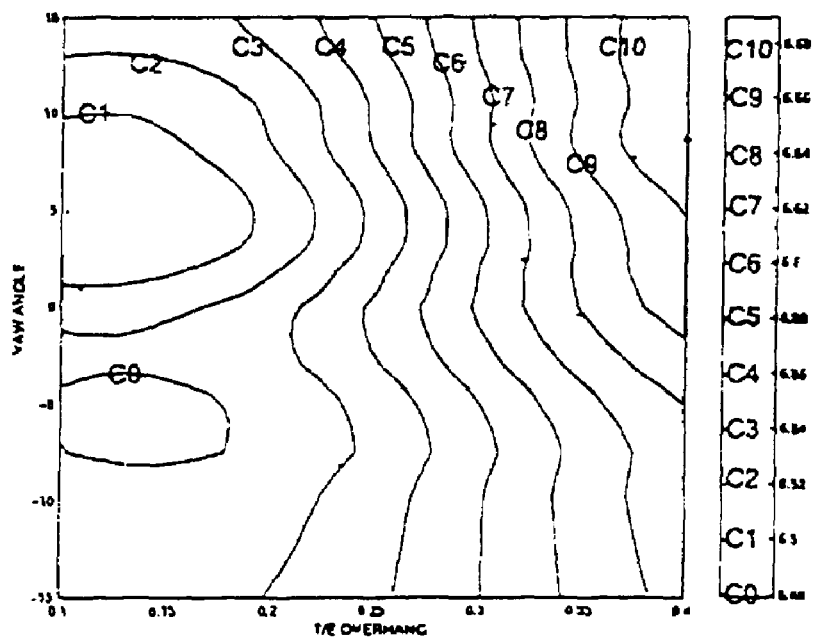
FIG. 8a is a graph showing contours of Lift/Drag corresponding to flow over the body shown in FIG. 1 when training of the response surface model has been stopped part-way in accordance with first convergence criteria identified from FIG. 6b.
Figure 8B:
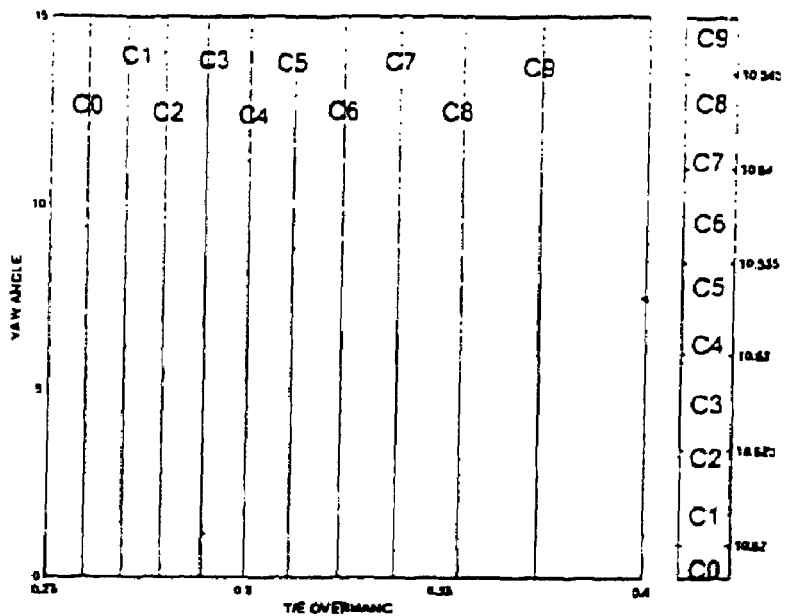

In these three example test arrangements, different optimisation techniques and different correlation conditions are applied. In addition, the way in which subsequent points are evaluated varies. In the first example, the expected improvement method identifies 5 update points (design points that are most likely to improve the response surface), and these 5 points are added to the initial set of 10 points. Step 108 is then processed, this time without interrupting convergence of the CFD model (in this test, the CFD model is subsequently run for 250 iterations for these 15 points). In the event that these values do not satisfy the optimisation criterion (step 109), the method returns to step 103. The resulting yaw angle/overhang response is shown in FIG. 7. In the second example, the local optima method reduces the domain from 60 points to 20 (with a lift/drag response shown in FIG. 8*a*), whereupon steps 103, 104 and 105 are repeated without interrupting convergence of the response surface (in this test, the response model is subsequently run for 250 iterations). The resulting L/D response, which is substantially flat, is shown in FIG. 8*b*, indicating that the Kriging method is not approximating the optimisation criterion well (despite the fact that the location of the optima appears to be well approximated).

Figure 9:
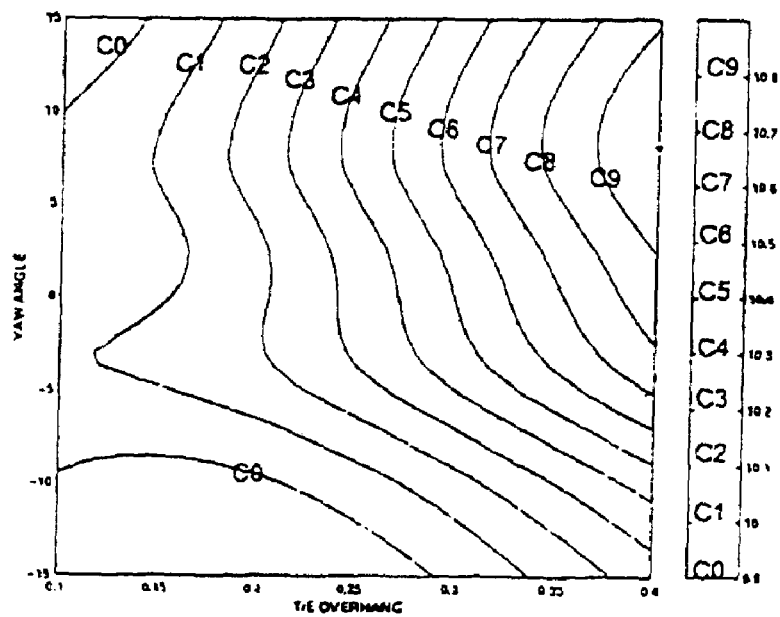
FIG. 9 is a graph showing contours of Lift/Drag corresponding to flow over the body shown in FIG. 1 when training of the response surface model has been stopped part-way in accordance with second convergence criteria identified from FIG. 6b.

In the third example, it is assumed that a high correlation at step 301 indicates that the optimum of the surface is at the same position in terms of yaw and overhang as it will be when the CFD simulations have fully converged. The RS does not therefore need improving and just one point is added at the position of the optimum. Convergence of the response surface is interrupted (in accordance with test based on correlation coefficient) at all points except the optimum point, each time the response surface is improved. The resulting yaw angle/overhang response is shown in FIG. 9. The computing times associated with these test arrangements are shown in Table 2:

TABLE 2

| Method | Overhang | Yaw | Optimum L/D | CPU hours |
|---|---|---|---|---|
| Standard - 60 points with full convergence | 0.400 | 7.968 | 10.519 | 540 |
| 1 | 0.381 | 7.500 | 10.527 | 135 |
| 2 | 0.400 | 7.500 | 10.541 | 222 |
| 3 | 0.400 | 8.202 | 10.585 | 290 |

It can be seen that all three test arrangements present significant computational time savings compared to the standard, fully converged arrangement, and all three test arrangements perform better than the standard arrangement, in so far as a higher optimum lift/drag ratio is found.

Figure 10:
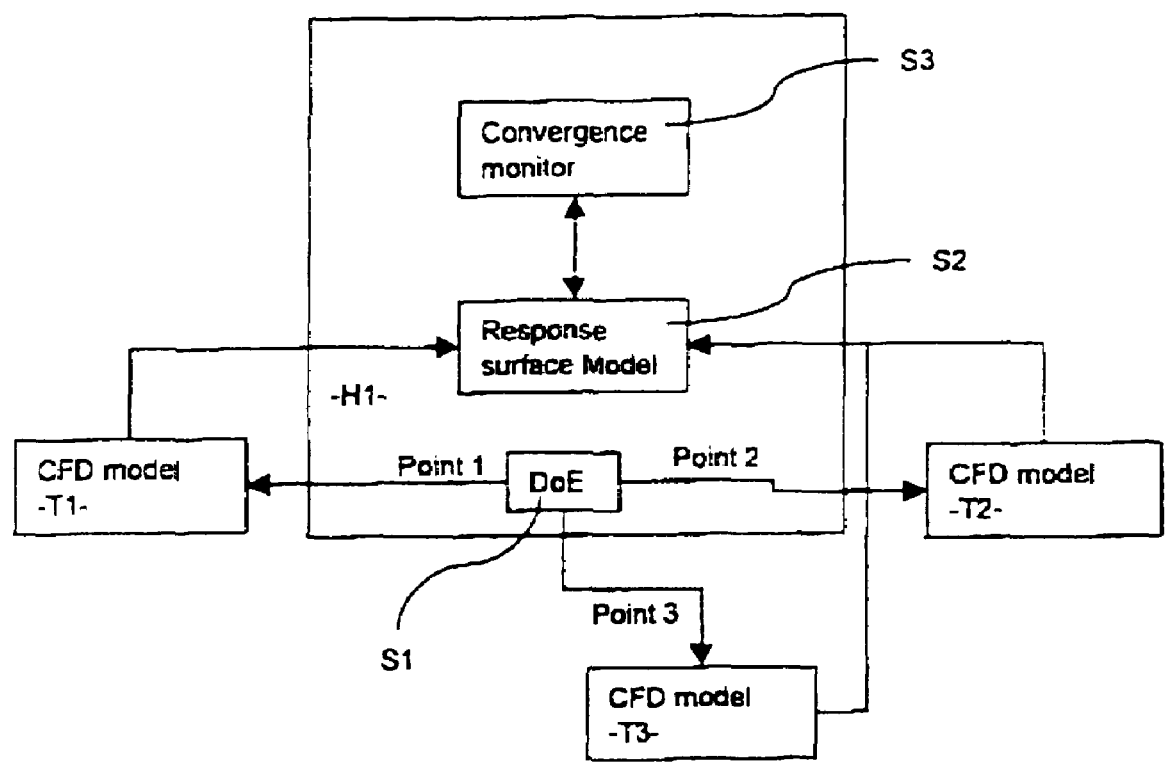
FIG. 10 is a block diagram showing computer components arranged to carry out the steps shown in FIGS. 2, 3 and 4.

FIG. 10 is a schematic diagram showing various computing components arranged to perform the method herein described. In this arrangement, the computing components comprise a local terminal H1 and a plurality of remote terminals T1, T2, T3 . . . Tn, the local terminal H1 being connected to the remote terminals T1, T2, T3 . . . Tn by means of an Ethernet connection or similar. In addition to standard CPU, memory, data bus, Input/Output ports, data storage, and operating system programs, the local terminal H1 comprises software S1 arranged to select the configurations according to step 101 and, for each configuration, to output data indicative thereof to one of the plurality of remote terminals T1, T2, T3 . . . Tn. In addition to standard CPU, memory, data bus, Input/Output ports, data storage, and operating system programs, each remote terminal T1, T2, T3 . . . Tn is configured to run CFD-related software for the wing configuration specified in the message sent from the local terminal H1. The CFD-related software may, for example, include meshing and flow simulation software, such as are provided by commercially available packages such as GAMBIT™, FLUENT™ or STAR CD™. Further details regarding mesh generation and configuration of the flow simulation code can be found in, for example Jameson, A., "Re-Engineering the Design Process Through Computation", Journal of Aircraft, Vol. 36, No. 1, January–February 1999. Samareh, J. A., "Status and Future of Geometry and Mesh Generation for Design and Optimisation", Journal of Aircraft, Vol. 36, No. 1, January–February and the manuals for the above codes.

Output from each of the CFD-running terminals T1, T2, T3 . . . Tn is transmitted to a response model software component S2, which is arranged to generate a response surface in the conventional manner described above. In addition to comprising conventional functionality, the response model software component comprises a convergence monitoring module S3, arranged to test for convergence of either the CFD data or the response surface, as described above. For clarity reasons the convergence monitoring module S3 is shown to be separate from the response model software S2; it will be appreciated that the monitoring module S3 can either be integral with, or separate from, the response model software S2.

Whilst in the above embodiments convergence of the CFD data or response surface is tested by means of correlation coefficient, other methods could be applied. For example, the change in gradient of the response surface over successive iterations (between at least two points forming the response surface (the number of points is at least one, and preferably two orders of magnitude higher)) could be compared with a specified gradient criterion. Selection of the points at which to perform the gradient comparison could, for example, be dependent on the optimisation method applied at step 107. For example, if the local optima method were used, comparison of gradients could be focused on those points within the localised area of optimisation.

Alternatively a method known as moving averages could be applied to the correlation coefficients. Moving averages operate on a time series of calculations, $r^2_{10}, r^2_{20}, r^2_d$ where d is the total number of iterations made so far and $r^2_d$ is the correlation coefficient generated at the most recent iteration (d increases in multiples of 10). Recalling that correlation coefficient $r^2_m$ represents the correlation between values at iteration n and m iterations earlier, the correlation coefficient itself already provides information about changes in values over time. However, by itself, the correlation coefficient merely provides information on two successive sets of iterations, and a benefit of applying a moving average evaluation is that the evolution of the correlation coefficient can be tracked.

For m=10, a simple moving average of correlations between n and the data 10 iterations, 20 iterations and 30 iterations before can be expressed as follows:

$$A=(r^2_{30}+r^2_{20}+r^2_{10})/3$$

It will be appreciated that instead of a simple moving average, a weighted moving average could be used.

Whilst in the above embodiments part-processing (partial convergence) of the CFD calculations is presented as an alternative to part-processing (partial convergence) of the response surface, it will be appreciated that a combination of both could be applied.

The Invention claimed is:

1. A method of identifying a configuration of an object that satisfies a predetermined optimisation criterion under specified conditions, the method comprising the steps of:
   (i) specifying a plurality of different object configurations;
   (ii) for each specified object configuration, using a first simulation procedure to simulate the specified conditions so as to generate data that can be used to evaluate the object configuration against the optimisation criterion, wherein the first simulation procedure comprises iteratively calculating values of variables characterising the object configuration;
   (iii) identifying a functional relationship between the data generated for each specified object configuration;
   (iv) using the functional relationship and the optimisation criterion to select a data point, and identifying an object configuration corresponding thereto; and
   (v) using a second simulation procedure, simulating the specified conditions in respect of the identified object configuration, wherein the second simulation procedure comprises iteratively calculating values of variables characterising the object configuration until the values satisfy a convergence criterion,
   wherein, for at least one of the specified object configurations, the first simulation procedure is completed before the values calculated therein satisfy the convergence criterion used in the second simulation procedure.

2. A method according to claim 1, wherein, for at least one of the specified object configurations, the values calculated on completion of the first simulation procedure are less than 99% correlated with values calculated on completion of the second simulation procedure, using the same object configuration.

3. A method according to claim 1, wherein the method comprises completing the first simulation procedure when the values calculated therein satisfy a convergence criterion which is different to the convergence criterion used in the second simulation procedure.

4. A method according to claim 3, wherein the convergence criterion used in the first simulation procedure is applied by calculating a correlation coefficient indicative of correlation in respect of successive iterations of values of variables and determining whether the calculated correlation coefficient is substantially equal to a specified correlation coefficient.

5. A method according to claim 4, including calculating an average of a succession of two or more correlation coefficients and determining whether the calculated average is substantially equal to a specified value.

6. A method according to claim 3, wherein convergence criterion used in the first simulation procedure is applied separately to values calculated for each specified object configuration.

7. A method according to claim 3, wherein convergence criterion used in the first simulation procedure is applied collectively to values calculated for each specified object configuration.

8. A method according to claim 7, wherein the convergence criterion used in the first simulation procedure is applied by identifying a different functional relationship between data generated for each specified object configuration in different iterations, and applying the convergence criterion to the different functional relationships.

9. A method according to claim 8, in which the functional relationship comprises a plurality of gradients and the method includes evaluating at least one of the plurality of gradients in the different functional relationships.

10. A method according to claim 1, wherein said second simulation procedure comprises evaluating data generated in the second simulation procedure against the optimisation criterion, and selecting the identified object configuration corresponding to said data if the optimisation criterion is met.

11. A method according to claim 1, wherein said second simulation procedure comprises evaluating data generated in the second simulation procedure against the optimisation criterion, and if the data does not meet the optimisation criterion, the method includes adding the identified object configuration to the plurality of specified object configurations and repeating steps (iii) to (v) until the identified object configuration satisfies the optimisation criterion.

12. A method according to claim 1, wherein the object comprises an aircraft structure.

13. A method according to claim 12, wherein the object comprises a flap track fairing associated with an aircraft wing.

14. A method according to claim 12, in which the variables include lift and drag associated with the object.

15. A data processing system arranged to perform the method according to claim 1.

16. Computer software arranged to perform the method according to claim 1.

17. A data carrier on which is supported computer software arranged to perform the method according to claim 1.

* * * * *